US009225662B2

(12) United States Patent
Abuelsaad et al.

(10) Patent No.: US 9,225,662 B2
(45) Date of Patent: Dec. 29, 2015

(54) COMMAND MANAGEMENT IN A NETWORKED COMPUTING ENVIRONMENT

(71) Applicant: International Business Machines Corporation, Armonk, NY (US)

(72) Inventors: Kelly Abuelsaad, Poughkeepsie, NY (US); Kulvir S. Bhogal, Pflugerville, TX (US); Lisa Seacat Deluca, San Francisco, CA (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/330,043

(22) Filed: Jul. 14, 2014

(65) Prior Publication Data

US 2014/0325077 A1    Oct. 30, 2014

Related U.S. Application Data

(63) Continuation of application No. 13/371,682, filed on Feb. 13, 2012, now Pat. No. 8,838,799.

(51) Int. Cl.
| | |
|---|---|
| *G06F 15/173* | (2006.01) |
| *H04L 12/911* | (2013.01) |
| *H04L 29/06* | (2006.01) |
| *G06F 9/50* | (2006.01) |
| *H04L 12/58* | (2006.01) |
| *H04L 29/08* | (2006.01) |

(52) U.S. Cl.
CPC .............. *H04L 47/70* (2013.01); *G06F 9/5072* (2013.01); *H04L 51/32* (2013.01); *H04L 63/10* (2013.01); *H04L 67/1021* (2013.01); *H04L 67/18* (2013.01); *H04L 67/22* (2013.01)

(58) Field of Classification Search
USPC ......................................................... 709/226
See application file for complete search history.

(56) References Cited

U.S. PATENT DOCUMENTS

| | | | |
|---|---|---|---|
| 7,171,353 | B2 | 1/2007 | Trower et al. |
| 7,774,349 | B2 | 8/2010 | Horvitz et al. |
| 7,996,525 | B2 | 8/2011 | Stienhans et al. |
| 8,190,740 | B2 | 5/2012 | Stienhans et al. |
| 8,260,931 | B2 | 9/2012 | Balasuramanian et al. |

(Continued)

OTHER PUBLICATIONS

Mell et al., "The NIST Definition of Cloud Computing", National Institute of Standards and Technology, Information Technology Laboratory, Version 15, Oct. 7, 2009, 2 pages.

(Continued)

*Primary Examiner* — Richard G Keehn
(74) *Attorney, Agent, or Firm* — Noah A. Sharkan; Maxine L. Barasch; Keohane & D'Alessandro PLLC

(57) ABSTRACT

Embodiments of the present invention provide an approach for identifying commands for virtual resource instances in a networked computing environment (e.g., a cloud computing environment). Specifically, in a typical embodiment, a set of commands for an instance of a virtual resource may be received in a computer memory medium or the like. The commands may then be analyzed and information pertaining to the commands may be stored in a computer storage device or the like. When a user/requester later wishes to identify a command to be utilized for another instance of the virtual resource, the requester can access the information and make a determination as to what commands are typically utilized for similar and/or previous instances of the virtual resource.

20 Claims, 7 Drawing Sheets

(56) References Cited

U.S. PATENT DOCUMENTS

| | | | |
|---|---|---|---|
| 8,335,765 B2 | 12/2012 | Sivasubramanian et al. | |
| 8,595,353 B2 | 11/2013 | DeLuca et al. | |
| 8,838,799 B2 | 9/2014 | Abuelsaad et al. | |
| 9,015,148 B2 | 4/2015 | White et al. | |
| 2002/0133710 A1 | 9/2002 | Tarbotton et al. | |
| 2007/0245010 A1 | 10/2007 | Arn et al. | |
| 2008/0162800 A1* | 7/2008 | Takashige et al. | 711/104 |
| 2008/0244579 A1* | 10/2008 | Muller | 718/100 |
| 2009/0132526 A1 | 5/2009 | Park | |
| 2009/0276771 A1 | 11/2009 | Nickolov et al. | |
| 2009/0327599 A1* | 12/2009 | Nonaka et al. | 711/112 |
| 2010/0030957 A1* | 2/2010 | Hirashima et al. | 711/111 |
| 2010/0153443 A1 | 6/2010 | Gaffga et al. | |
| 2010/0169340 A1 | 7/2010 | Kenedy et al. | |
| 2010/0198944 A1 | 8/2010 | Ho et al. | |
| 2010/0205541 A1* | 8/2010 | Rapaport et al. | 715/753 |
| 2010/0287071 A1 | 11/2010 | Shah et al. | |
| 2010/0325629 A1 | 12/2010 | Fujioka et al. | |
| 2011/0010324 A1 | 1/2011 | Bolivar et al. | |
| 2011/0055399 A1 | 3/2011 | Tung et al. | |
| 2011/0145392 A1 | 6/2011 | Dawson et al. | |
| 2011/0173328 A1 | 7/2011 | Park et al. | |
| 2011/0179132 A1 | 7/2011 | Mayo et al. | |
| 2011/0185305 A1* | 7/2011 | Lai et al. | 715/772 |
| 2011/0225467 A1 | 9/2011 | Betzler et al. | |
| 2011/0270937 A1* | 11/2011 | Portilla | 709/206 |
| 2011/0314466 A1 | 12/2011 | Berg et al. | |
| 2012/0084297 A1 | 4/2012 | Mishne et al. | |
| 2012/0089971 A1* | 4/2012 | Williams et al. | 717/167 |
| 2012/0131567 A1* | 5/2012 | Barros et al. | 717/170 |
| 2012/0216052 A1* | 8/2012 | Dunn | 713/193 |
| 2013/0007265 A1 | 1/2013 | Benedetti et al. | |
| 2013/0054830 A1* | 2/2013 | Nguyen et al. | 709/238 |
| 2013/0073670 A1* | 3/2013 | Das et al. | 709/217 |
| 2013/0074064 A1* | 3/2013 | Das et al. | 718/1 |
| 2013/0132556 A1* | 5/2013 | DeLuca et al. | 709/224 |
| 2013/0212276 A1 | 8/2013 | Abuelsaad et al. | |
| 2014/0074629 A1* | 3/2014 | Rathod | 705/14.73 |
| 2014/0330975 A1 | 11/2014 | Abuelsaad et al. | |

OTHER PUBLICATIONS

Nurmi, D. et al., "The Eucalyptus Open-source Cloud-computing System", www.cca008.org, 2009, 5 pages.

U.S. Appl. No. 13/371,682, Office Action, Sep. 20, 2013, 18 pages.

U.S. Appl. No. 13/371,682, Final Office Action, Feb. 27, 2014, 19 pages.

U.S. Appl. No. 13/371,682, Notice of Allowance & Fees Due, May 14, 2014, 25 pages.

Maitland, J., "Keeping Control Isn't Easy", Chapter 4: Cloud-Based Infrastructure, SearchCloudComputing.com, Publication Date: Oct. 2009, 19 pages.

Muntz, F., "Oracle Middleware and Cloud Computing", Apr. 28, 2012, 18 pages.

Cosley, D., "Referee: An open framework for practical testing of recommender systems using ResearchIndex", Proceedings of the 28th VLBD Conference, Hong Kong, China, 2002, 12 pages.

Anthony R. Curro, USPTO Non-final Office Action, U.S. Appl. No. 12/153,492, Mail Date Dec. 21, 2012, 31 pages.

U.S. Appl. No. 13/875,464, Notice of Allowance dated May 26, 2015, 36 pages.

U.S. Appl. No. 13/875,464, Notice of Allowance dated Jul. 27, 2015, 10 pages.

\* cited by examiner

| HADOOP INSTANCE | 112A-N |
|---|---|

TOP 10 COMMANDS EXECUTED AGAINST BASE IMAGE OF HADOOP

| Command | Count |
|---|---|
| sudo -i | 3,939 |
| /home/opt/ibm/WebSphere/AppServer/profiles/AppSrv01/bin/startServer.sh server1 | 3,840 |
| /home/opt/apache/hadoop/bin/start-dfs.sh (sh hadoop user) | 3,575 |
| /home/opt/IBM/WebSphere/AppServer/profiles/AppSrv01/bin/stopServer.sh server1 | 2,575 |
| /home/opt/apache/apache-activemq-5.4.2/bin/activemq start (as hadoop user) | 1,666 |
| db2start | 1,614 |
| tail -f /home/opt/IBM/WebSphere/AppServer/profiles/AppSrv01/logs/server1/trace.log | 1,501 |
| ... | 1,491 |
| ... | 1,463 |
| ... | 1,190 |

FIG. 6

COMMAND MANAGEMENT IN A NETWORKED COMPUTING ENVIRONMENT

RELATED U.S. APPLICATION DATA

The present patent document is a continuation of U.S. patent application Ser. No. 13/371,682, filed Feb. 13, 2012, entitled "COMMAND MANAGEMENT IN A NETWORKED COMPUTING ENVIRONMENT", the disclosure of which is incorporated herein by reference.

TECHNICAL FIELD

In general, embodiments of the present invention provide an approach for virtual resource instance management. Specifically, embodiments of the present invention relate to an approach for identifying commands for virtual resource instances in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

In networked computing environments, customers may instantiate instances of virtual images or other virtual resources. Challenges may exist, however, in identifying how and where to interact with a newly instantiated instance. Specifically, it may be difficult for a user/customer to select what commands to utilize with a particular instance.

SUMMARY

In general, embodiments of the present invention provide an approach for identifying commands for virtual resource instances in a networked computing environment (e.g., a cloud computing environment). Specifically, in a typical embodiment, a set of commands for an instance of a virtual resource may be received in a computer memory medium or the like. The commands may then be analyzed and information pertaining to the commands may be stored in a computer storage device or the like. When a user/requester later wishes to identify a command to be utilized for another instance of the virtual resource, the requester can access the information and make a determination as to what commands are typically utilized for similar and/or previous instances of the virtual resource.

A first aspect of the present invention provides a computer-implemented method for identifying commands for virtual resource instances in a networked computing environment, comprising: receiving, in a computer memory medium, a set of commands for an instance of virtual resource in the networked computing environment; analyzing the set of commands to identify information pertaining to the set of commands, the information identifying at least one of the following: the set of commands, at least one directory in which the set of commands were executed, a base image associated with the instance, a set of demographic information about a set of users executing the set of commands, a status of at least one software program running on the instance, a set of tags associated with the set of commands, or at least one geographic location where the set of commands were executed; storing the information in a computer storage device; receiving, from a requester, a request to access at least a subset of the information; retrieving the at least a subset of the information from the computer storage device; and providing the at least a subset of the information to the requester.

A second aspect of the present invention provides a system for identifying commands for virtual resource instances in a networked computing environment, comprising: a memory medium comprising instructions; a bus coupled to the memory medium; and a processor coupled to the bus that when executing the instructions causes the system to: receive, in a computer memory medium, a set of commands for an instance of virtual resource in the networked computing environment; analyze the set of commands to identify information pertaining to the set of commands, the information identifying at least one of the following: the set of commands, at least one directory in which the set of commands were executed, a base image associated with the instance, a set of demographic information about a set of users executing the set of commands, a status of at least one software program running on the instance, a set of tags associated with the set of commands, or at least one geographic location where the set of commands were executed; store the information in a computer storage device; receive, from a requester, a request to access at least a subset of the information; retrieve the at least a subset of the information from the computer storage device; and provide the at least a subset of the information to the requester.

A third aspect of the present invention provides a computer program product for identifying commands for virtual resource instances in a networked computing environment, the computer program product comprising a computer readable storage media, and program instructions stored on the computer readable storage media, to: receive, in a computer memory medium, a set of commands for an instance of virtual resource in the networked computing environment; analyze the set of commands to identify information pertaining to the set of commands, the information identifying at least one of the following: the set of commands, at least one directory in which the set of commands were executed, a base image associated with the instance, a set of demographic information about a set of users executing the set of commands, a status of at least one software program running on the instance, a set of tags associated with the set of commands, or at least one geographic location where the set of commands were executed; store the information in a computer storage device; receive, from a requester, a request to access at least a subset of the information; retrieve the at least a subset of the information from the computer storage device; and provide the at least a subset of the information to the requester.

A fourth aspect of the present invention provides a method for deploying a system for identifying commands for virtual resource instances in a networked computing environment, comprising: providing a computer infrastructure being operable to: receive, in a computer memory medium, a set of commands for an instance of virtual resource in the networked computing environment; analyze the set of commands to identify information pertaining to the set of commands, the information identifying at least one of the following: the set of commands, at least one directory in which the set of commands were executed, a base image associated with the instance, a set of demographic information about a set of users executing the set of commands, a status of at least one software program running on the instance, a set of tags associated with the set of commands, or at least one geographic location where the set of commands were executed; store the information in a computer storage device; receive, from a requester, a request to access at least a subset of the information; retrieve the at least a subset of the information from the computer storage device; and provide the at least a subset of the information to the requester.

BRIEF DESCRIPTION OF THE DRAWINGS

These and other features of this invention will be more readily understood from the following detailed description of the various aspects of the invention taken in conjunction with the accompanying drawings in which:

FIG. 6 depicts an illustrative display of suggested comments generated according to an embodiment of the present invention.

Figure 1:
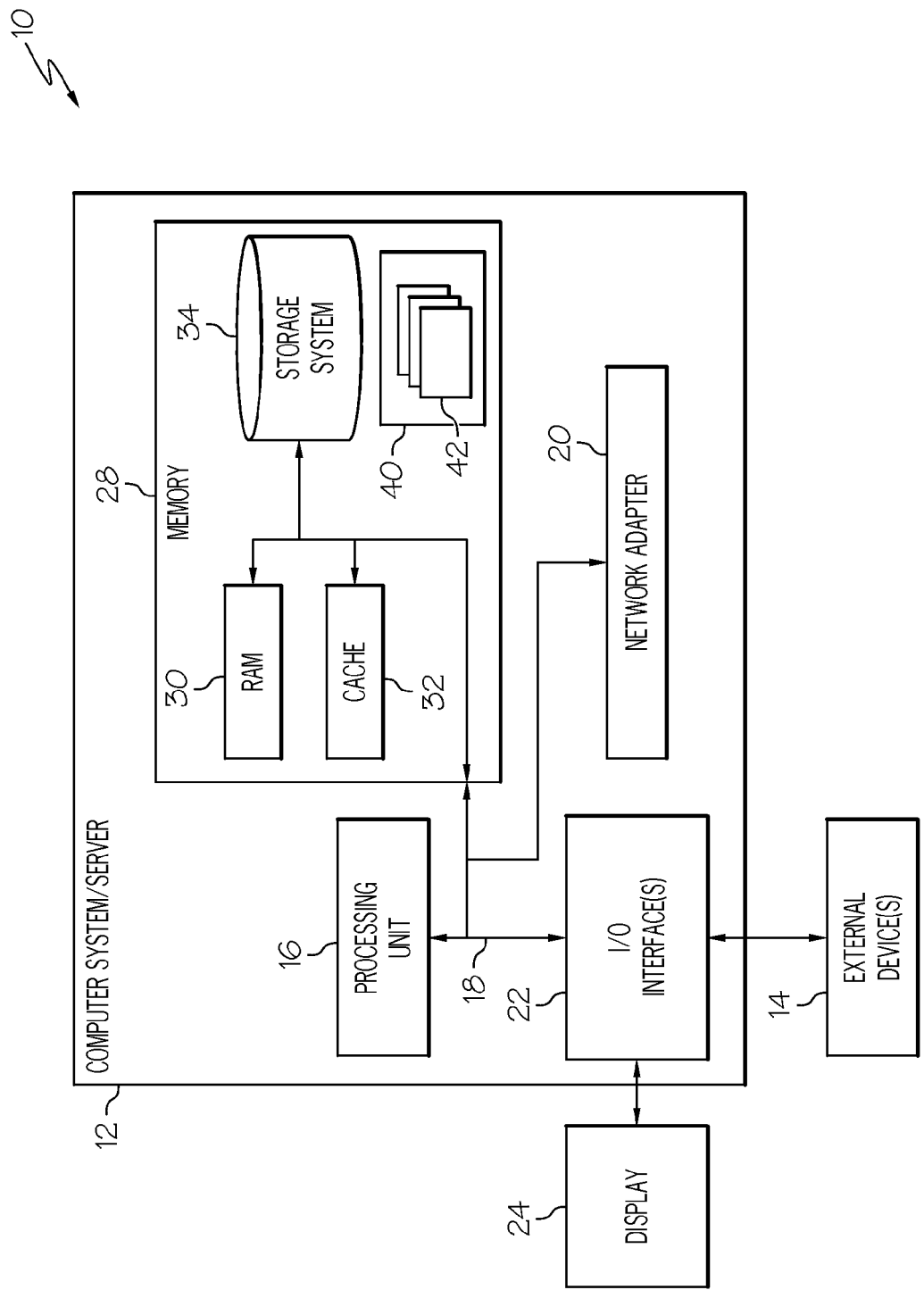
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for identifying commands for virtual resource instances in a networked computing environment (e.g., a cloud computing environment). Specifically, in a typical embodiment, a set of commands for an instance of a virtual resource may be received in a computer memory medium or the like. The commands may then be analyzed and information pertaining to the commands may be stored in a computer storage device or the like. When a user/requester later wishes to identify a command to be utilized for another instance of the virtual resource, the requester can access the information and make a determination as to what commands are typically utilized for similar and/or previous instances of the virtual resource.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
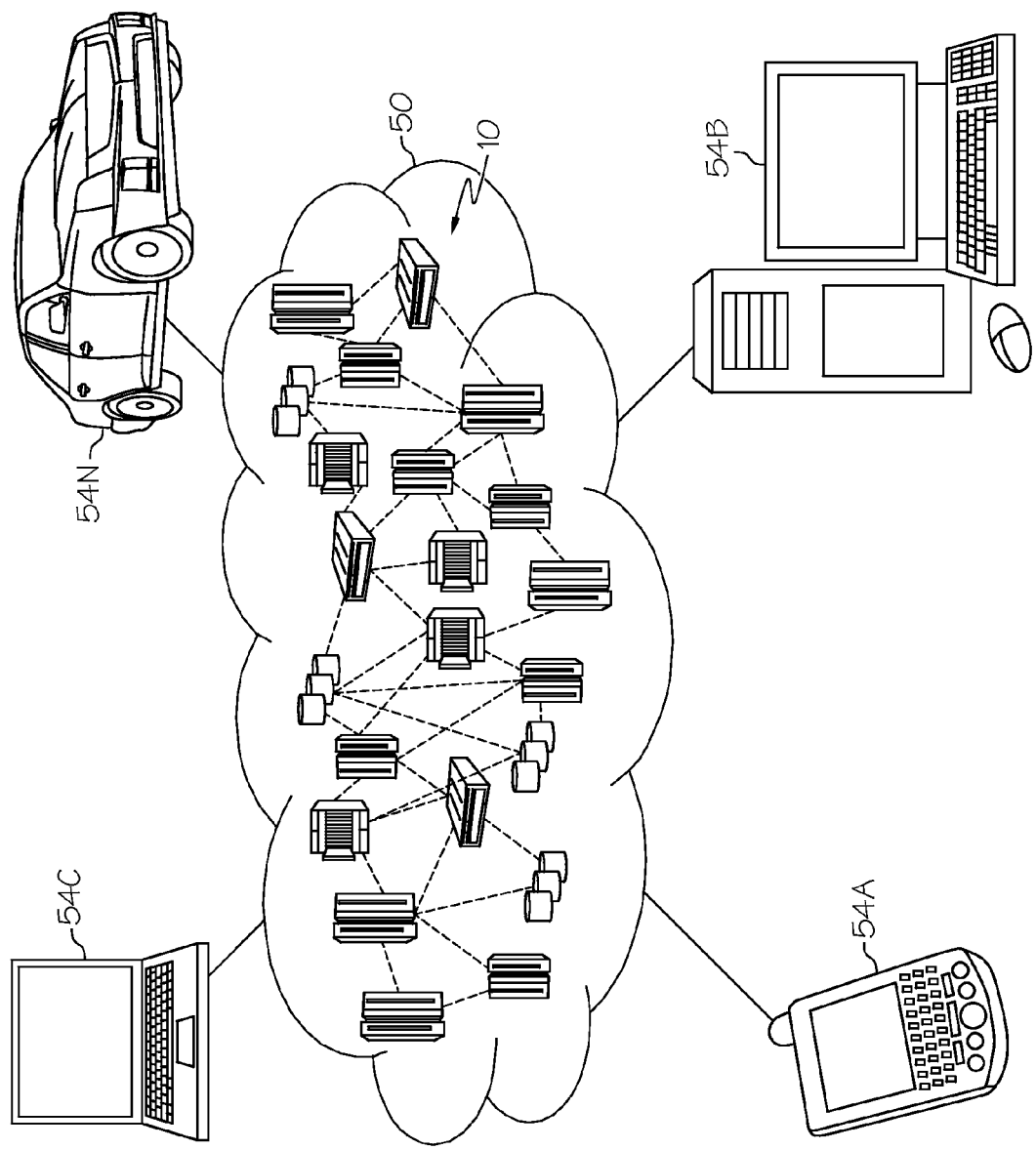
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
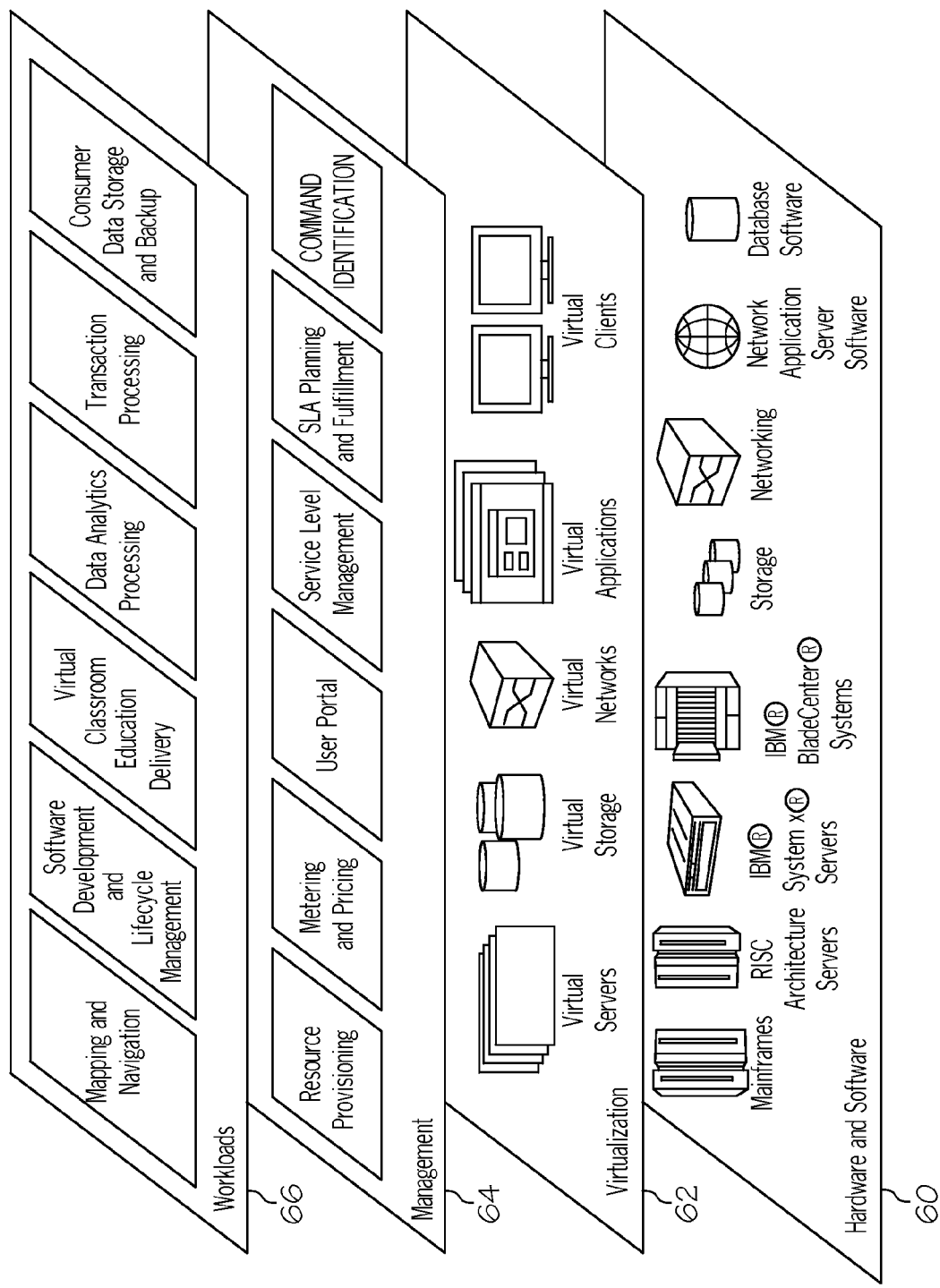
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is command identification, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the command identification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
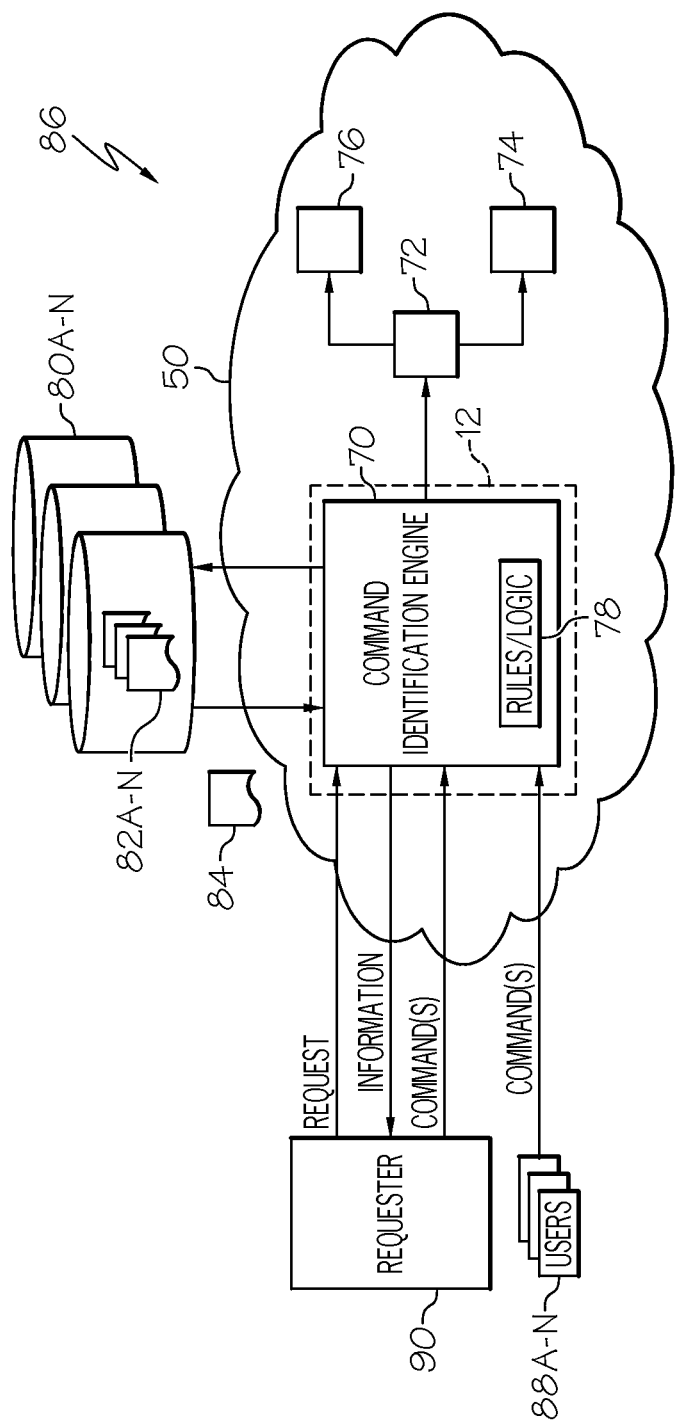
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have a command identification engine (engine 70). Rather, engine 70 could be loaded on a server or server-capable device that communicates (e.g., wirelessly) with the clients to provide device protection therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules 78 and/or provides command identification hereunder. It is further understood that command identification engine 70 may be incorporated within or work in conjunction with any type of system that receives, processes and/or executes commands with respect to virtual resources in a networked computing environment. Such other system(s) have not been shown in FIG. 4 for brevity purposes.

Along these lines, engine 70 may perform multiple functions similar to a general-purpose computer. Specifically, among other functions, engine 70 may (among other things): receive, in a computer memory medium (e.g., 28 of FIG. 1), a set of commands (e.g., from users 88A-N) for an instance 74 of virtual resource 72 in the networked computing environment 86; analyze the set of commands to identify information 82A-N pertaining to the set of commands, the information 82A-N identifying at least one of the following: the set of commands, at least one directory in which the set of commands were executed, a base image associated with the instance 74, a set of demographic information about a set of users executing the set of commands, a status of at least one software program running on the instance 74, a set of tags associated with the set of commands, or at least one geographic location where the set of commands were executed; store the information 82A-N in a computer storage device 80; execute at least one of the set of commands against the instance 74; receive, from a requester 90, a request to access at least a subset of the information; retrieve the at least a subset 84 of the information 82A-N from the computer storage device 80A-N; provide the at least a subset 84 of the information 82A-N to the requester 90; display the at least a subset 84 of the information 82A-N in a user interface accessible to the requester 90; display the at least the subset 84 of the information 82A-N within the virtual resource 72; and/or refine the at least a subset 82A-N of the information 84 based on at least one of the following: a location of the requester 90, a set of keywords, a level of use of the set of commands, a time since the instance 74 was provisioned, a status of software running on the instance 74, a popularity of the set of commands, or a level of expertise of a set of users executing the set of commands; receive at least one command from the requester 90, the at least one command being identified based on the at least a subset 84 of the information 82A-N; and/or execute the at least one command on another instance 76 of the virtual resource 72.

Illustrative Example

This section will describe an illustrative example of one manner/scenario in which the embodiments of the present invention can be carried out. It is understood in advance that the teachings recited herein are not intended to be limited to this particular scenario.

1. A cloud management provides (e.g., a company) implements engine 70.
2. Individuals/companies using a cloud resource provided by the cloud management provides can opt into transmitting command information back to engine 70.
   A. Preferences could be set such as:
      1. Denied lists of commands not to share;
      2. A threshold of uses before a command is shared (e.g., only share after I've used a command 15 times);
      3. Directories from which the command was executed to determine whether to share or not to share. (e.g., if from/home/private, don't share); and/or
      4. Keywords such that it is permissible to share commands that include the word "start" or "shutdown."
3. A user logs into the cloud resource and executes a command.
4. If enabled, the command is both executed against the cloud resource and sent to the engine 70.
5. The engine 70 continually collects data such as:
   A. Incoming commands;
   B. The directory/path in which the command was executed;
   C. The instance against which the command was executed;
   D. Tags associated with the commands. (e.g., the user would tag start-dfs.sh with "start Hadoop" so other users know that the command starts Hadoop); and/or
   E. The geographical location where the command was executed.
6. Optionally, highly simple commands (e.g., ls-al) may be ignored by the system.
7. If another user wishes to view commands identified via crowd sourcing they may do so at any time, e.g., those:
   A. Displayed within a cloud management area associated with each image; and/or
   B. Displayed within the resource either:
      1. From a pull mechanism;
      2. As deployed as an artifact at instance creation time;
      3. As a user begins to type a command; and/or
      4. As a stand-alone asset associated with the resource.
8. Commands may be further refined based on:
   A. Location of the user in comparison with location where executed (e.g., view commands entered by other users located in Dallas, Tex.);
   B. Geographic location of the cloud user (e.g., other individuals similar to you ran the following commands);
   C. Popularity;
   D. Keyword; and/or
   E. Expertise level of users executing the command.
      1. Expertise can be determined using, for example:
         a. Social networking websites;
         b. Intranet resources.

Figure 5:
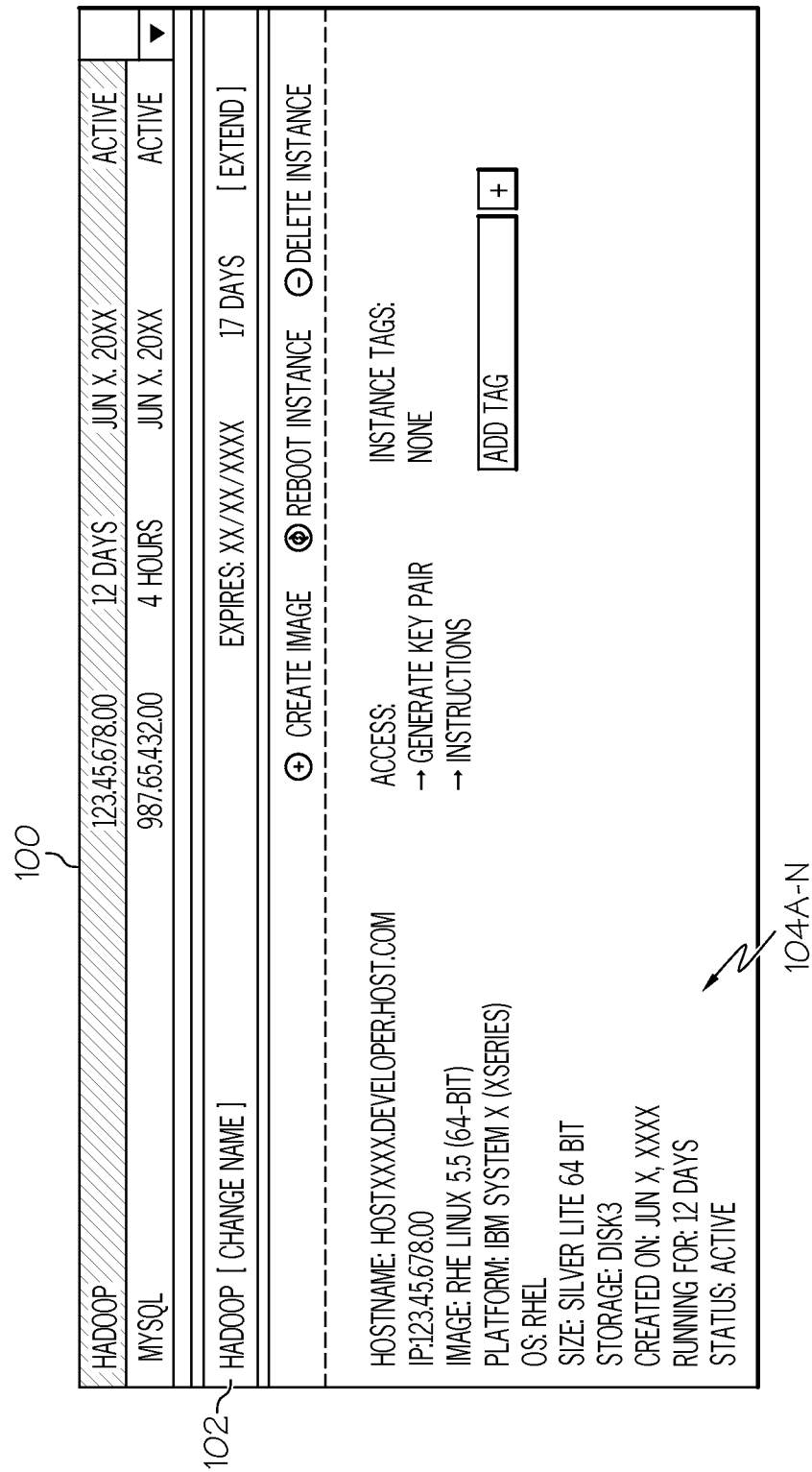
FIG. 5 depicts an illustrative user interface associated with an instance of a virtual resource according to an embodiment of the present invention.

These concepts will be further illustrated in conjunction with FIGS. 5-6. Assume in this example that user "A" is new to using Apache Hadoop® but desires to do some initial testing (Apache, Hadoop and realted terms are trademarks of the Apache Software Foundation, Inc. in the United States and/or other countries). Further assume that user "A" observces Cloud "X" and user "A" determines that he/she can quickly create an instance of a Hadoop image, and that user "A" so based on that observation. FIG. 5 shows a user interface/graphic 100 associated with the image/generate instance. As depicted, graphic 100 includes the image name 102, as well as several other pieces of instance information 104A-N such as: hostname, internet protocol address, image descriptor, platform, operating system, size, storage identifier, creation date, running time, and/or status.

As indicated above, since user "A" is unfamiliar with Apache Hadoop, he/she may not readily know what command(s) to execute against thos instance. FIG. 6 depicts an interface/display 110 comprising the subset of information that may be delivered to a requester by engine 70 as indicated above in conjunction with FIG. 4. As depicted, display 110 may comprise the most frequently used commands 112A-N executed against a base image of Hadoop. This may be a good indicator to user "A" what commands he/she may want to consider. Along these lines, the commands 112A-N could be sorted based on popularity among users with the same base image as user "A's" image. In addition, hints such as where Hadoop is installed on the image can be implied by paths specified in the commands.

Figure 7:
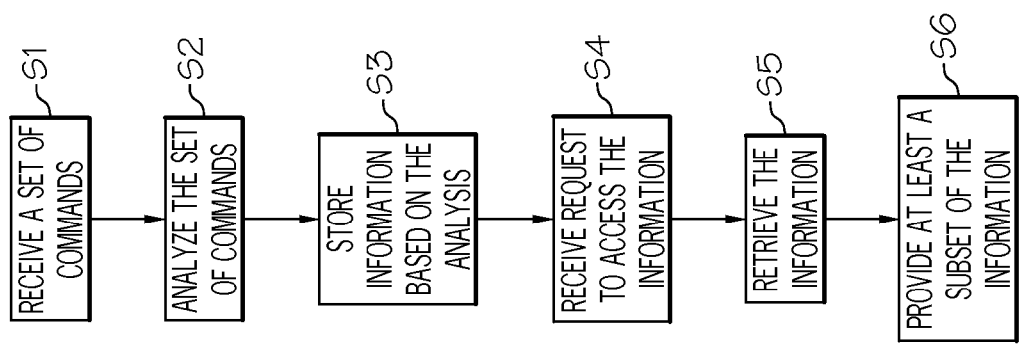
FIG. 7 depicts a method flow diagram according to an embodiment of the present invention.

Referring now to FIG. 7, a method flow diagram according to an embodiment of the present invention is shown. In step S1, a set of commands is received for an instance of virtual resource in the networked computing environment. In step S2, the set of commands is analyzed to identify information pertaining to the set of commands, the information identifying at least one of the following: the set of commands, at least one directory in which the set of commands were executed, a base image associated with the instance, a set of demographic information about a set of users executing the set of commands, a status of at least one software program running on the instance, a set of tags associated with the set of commands, or at least one geographic location where the set of commands were executed. In step S3, the information is stored in a computer storage device. In step S4, a request is received from a requester to access at least a subset of the information. In step S5, the at least a subset of the information is retrieved from the computer storage device. In step S6, the at least a subset of the information is provided to the requester.

While shown and described herein as a command identification solution, it is understood that the invention further provides various alternative embodiments. For example, in one embodiment, the invention provides a computer-readable/useable medium that includes computer program code to enable a computer infrastructure to provide command identification functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide command identification functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for command identification. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for identifying commands for virtual resource instances in a networked computing environment, comprising:
   receiving a set of preferences from an end user comprising a set of rules indicating a set of commands that should be transmitted to a computer memory medium when executed by the end user, the set of commands comprising commands for an instance of a virtual resource provided by a resource provider for use by the end user in a networked computing environment,
   wherein the set of rules comprises one or more of:
      at least one denied list comprising commands not to be transmitted;
      a threshold of uses after which at least one command is to be transmitted;
      at least one directory from which the command was executed to be transmitted;

at least one directory from which the command was executed not to be transmitted; or
at least one keyword indicating the command to be transmitted;
receiving, in the computer memory medium, at least one command of the set of commands in response to execution of the at least one command by the end user;
analyzing the received at least one command of the set of commands to identify information pertaining to the set of commands, the information identifying at least one of the following: the set of commands, at least one directory in which the set of commands were executed, a base image associated with the instance, a set of demographic information about a set of users executing the set of commands, a status of at least one software program running on the instance, a set of tags associated with the set of commands, and at least one geographic location where the set of commands were executed;
storing the information in a computer storage device;
receiving, from a requester, a request to access at least a subset of the information;
retrieving the at least a subset of the information from the computer storage device; and
providing the at least a subset of the information to the requester.

2. The computer-implemented method of claim 1, further comprising executing at least one of the set of commands against the instance.

3. The computer-implemented method of claim 1, further comprising receiving at least one command from the requester, the at least one command being identified based on the at least a subset of the information.

4. The computer-implemented method of claim 1, the providing comprising displaying the at least a subset of the information in a user interface accessible to the requester.

5. The computer-implemented method of claim 1, the providing comprising displaying the at least a subset of the information within the virtual resource.

6. The computer-implemented method of claim 1, further comprising refining the at least a subset of the information based on at least one of the following: a location of the requester, a set of keywords, a level of use of the set of commands, a time since the instance was provisioned, a status of software running on the instance, a popularity of the set of commands, or a level of expertise of a set of users executing the set of commands.

7. The computer-implemented method of claim 1, the networked computing environment comprising a cloud computing environment and the set of commands comprising a set of commands utilized within a cloud computing environment.

8. The method of claim 1, wherein a service solution provider provides a computer infrastructure that performs the method for one or more consumers.

9. A system for identifying commands for virtual resource instances in a networked computing environment, comprising:
a memory medium comprising instructions;
a bus coupled to the memory medium; and
a processor coupled to the bus that when executing the instructions causes the system to:
receive a set of preferences from an end user comprising a set of rules indicating a set of commands that should be transmitted to a computer memory medium when executed by the end user, the set of commands comprising commands for an instance of a virtual resource provided by a resource provider for use by the end user in a networked computing environment;
wherein the set of rules comprises one or more of:
at least one denied list comprising commands not to be transmitted;
a threshold of uses after which at least one command is to be transmitted;
at least one directory from which the command was executed to be transmitted;
at least one directory from which the command was executed not to be transmitted; or
at least one keyword indicating the command to be transmitted;
receive, in the computer memory medium, at least one command of the set of commands in response to execution of the at least one command by the end user;
analyze the received at least one command of the set of commands to identify information pertaining to the set of commands, the information identifying at least one of the following: the set of commands, at least one directory in which the set of commands were executed, a base image associated with the instance, a set of demographic information about a set of users executing the set of commands, a status of at least one software program running on the instance, a set of tags associated with the set of commands, and at least one geographic location where the set of commands were executed;
store the information in a computer storage device;
receive, from a requester, a request to access at least a subset of the information;
retrieve the at least a subset of the information from the computer storage device; and
provide the at least a subset of the information to the requester.

10. The system of claim 9, the memory medium further comprising instructions for causing the system to execute at least one of the set of commands against the instance.

11. The system of claim 9, the memory medium further comprising instructions for causing the system to receive at least one command from the requester, the at least one command being identified based on the at least a subset of the information.

12. The system of claim 9, the memory medium further comprising instructions for causing the system to display the at least a subset of the information in at least one of: within the virtual resource, or on a user interface accessible to the requester.

13. The system of claim 9, the memory medium further comprising instructions for causing the system to refine the at least a subset of the information based on at least one of the following: a location of the requester, a set of keywords, a level of use of the set of commands, a time since the instance was provisioned, a status of software running on the instance, a popularity of the set of commands, or a level of expertise of a set of users executing the set of commands.

14. The system of claim 9, the networked computing environment comprising a cloud computing environment and the set of commands comprising a set of commands utilized within a cloud computing environment.

15. A computer program product for identifying commands for virtual resource instances in a networked computing environment, the computer program product comprising a computer readable hardware storage device, and program instructions stored on the computer readable hardware storage device, to:
receive a set of preferences from an end user comprising a set of rules indicating a set of commands that should be transmitted to a computer memory medium when executed by the end user, the set of commands comprising commands for an instance of a virtual resource provided by a resource provider for use by the end user in a networked computing environment wherein the set of rules comprises one or more of:
- at least one denied list comprising commands not to be transmitted;
- a threshold of uses after which at least one command is to be transmitted;
- at least one directory from which the command was executed to be transmitted;
- at least one directory from which the command was executed not to be transmitted; or
- at least one keyword indicating the command to be transmitted;

receive, in the computer memory medium, at least one command of the set of commands in response to execution of the at least one command by the end user;

analyze the received at least one command of the set of commands to identify information pertaining to the set of commands, the information identifying at least one of the following: the set of commands, at least one directory in which the set of commands were executed, a base image associated with the instance, a set of demographic information about a set of users executing the set of commands, a status of at least one software program running on the instance, a set of tags associated with the set of commands, and at least one geographic location where the set of commands were executed;

store the information in a computer storage device;

receive, from a requester, a request to access at least a subset of the information;

retrieve the at least a subset of the information from the computer storage device; and provide the at least a subset of the information to the requester.

16. The computer program product of claim 15, the computer readable hardware storage device further comprising instructions to execute at least one of the set of commands against the instance.

17. The computer program product of claim 15, the computer readable hardware storage device further comprising instructions to receive at least one command from the requester, the at least one command being identified based on the at least a subset of the information.

18. The computer program product of claim 15, the computer readable hardware storage device further comprising instructions for causing the system to display the at least a subset of the information in at least one of: within the virtual resource, or on a user interface accessible to the requester.

19. The computer program product of claim 15, the computer readable hardware storage device further comprising instructions to refine the at least a subset of the information based on at least one of the following: a location of the requester, a set of keywords, a level of use of the set of commands, a time since the instance was provisioned, a status of software running on the instance, a popularity of the set of commands, or a level of expertise of a set of users executing the set of commands.

20. The computer program product of claim 15, the networked computing environment comprising a cloud computing environment and the set of commands comprising a set of commands utilized within a cloud computing environment.

* * * * *